(12) United States Patent
Bulat et al.

(10) Patent No.: US 8,313,324 B2
(45) Date of Patent: Nov. 20, 2012

(54) FUEL RATIO CONTROL IN A COMBUSTION APPARATUS WITH MULTIPLE FUEL SUPPLY LINES

(75) Inventors: Ghenadie Bulat, Notts (GB); Robin McMillan, Bardney (GB)

(73) Assignee: Siemens Aktiengesellschaft, München (DE)

(*) Notice: Subject to any disclaimer, the term of this patent is extended or adjusted under 35 U.S.C. 154(b) by 863 days.

(21) Appl. No.: 12/087,906

(22) PCT Filed: Dec. 8, 2006

(86) PCT No.: PCT/EP2006/069494
§ 371 (c)(1),
(2), (4) Date: May 11, 2009

(87) PCT Pub. No.: WO2007/082608
PCT Pub. Date: Jul. 26, 2007

(65) Prior Publication Data
US 2009/0217672 A1    Sep. 3, 2009

(30) Foreign Application Priority Data

Jan. 19, 2006  (GB) .................................. 0601038.3

(51) Int. Cl.
*F02C 9/26* (2006.01)
(52) U.S. Cl. ................ 431/12; 431/19; 431/23; 60/772; 60/39.281
(58) Field of Classification Search ........ 137/6; 60/772, 60/39.281
See application file for complete search history.

(56) References Cited

U.S. PATENT DOCUMENTS 7,523,603 B2 *   4/2009   Hagen et al. ................. 60/39.55

FOREIGN PATENT DOCUMENTS

| EP | 0 899 506 A2 | 3/1999 |
|---|---|---|
| EP | 1 205 653 A1 | 5/2002 |
| EP | 1 331 448 A2 | 7/2003 |
| EP | 1 387 062 A2 | 2/2004 |
| EP | 1 510 755 A1 | 3/2005 |
| EP | 1 662 116 A1 | 5/2006 |
| RU | 2059092 C1 | 4/1996 |
| RU | 2162953 C2 | 3/1999 |
| RU | 2131531 C1 | 6/1999 |
| SU | 1028954 A | 7/1983 |
| WO | WO 2005/010437 A1 | 2/2005 |
| WO | WO 2005/093327 A1 | 10/2005 |
| WO | WO 2005/095863 A1 | 10/2005 |

* cited by examiner

*Primary Examiner* — Alfred Basichas

(57) ABSTRACT

A combustion apparatus is provided which includes an incoming fuel supply line that supplies fuel in a plurality of fuel-supply lines to one or more burners, the burners being associated with a combustion volume. A temperature sensor is located in the apparatus so as to yield temperature information relating to a component part of the apparatus, which is to be prevented from overheating The apparatus also includes a control arrangement, which detects the temperature-sensor output and, depending on that output, varies the fuel supplies to one or more of the burners in such a way as to maintain the temperature of the component part below a maximum value, while keeping the fuel in the incoming fuel supply line substantially constant. The control unit preferably also strives to adjust the operating conditions of the apparatus so that pressure oscillations are kept below a maximum value.

7 Claims, 15 Drawing Sheets

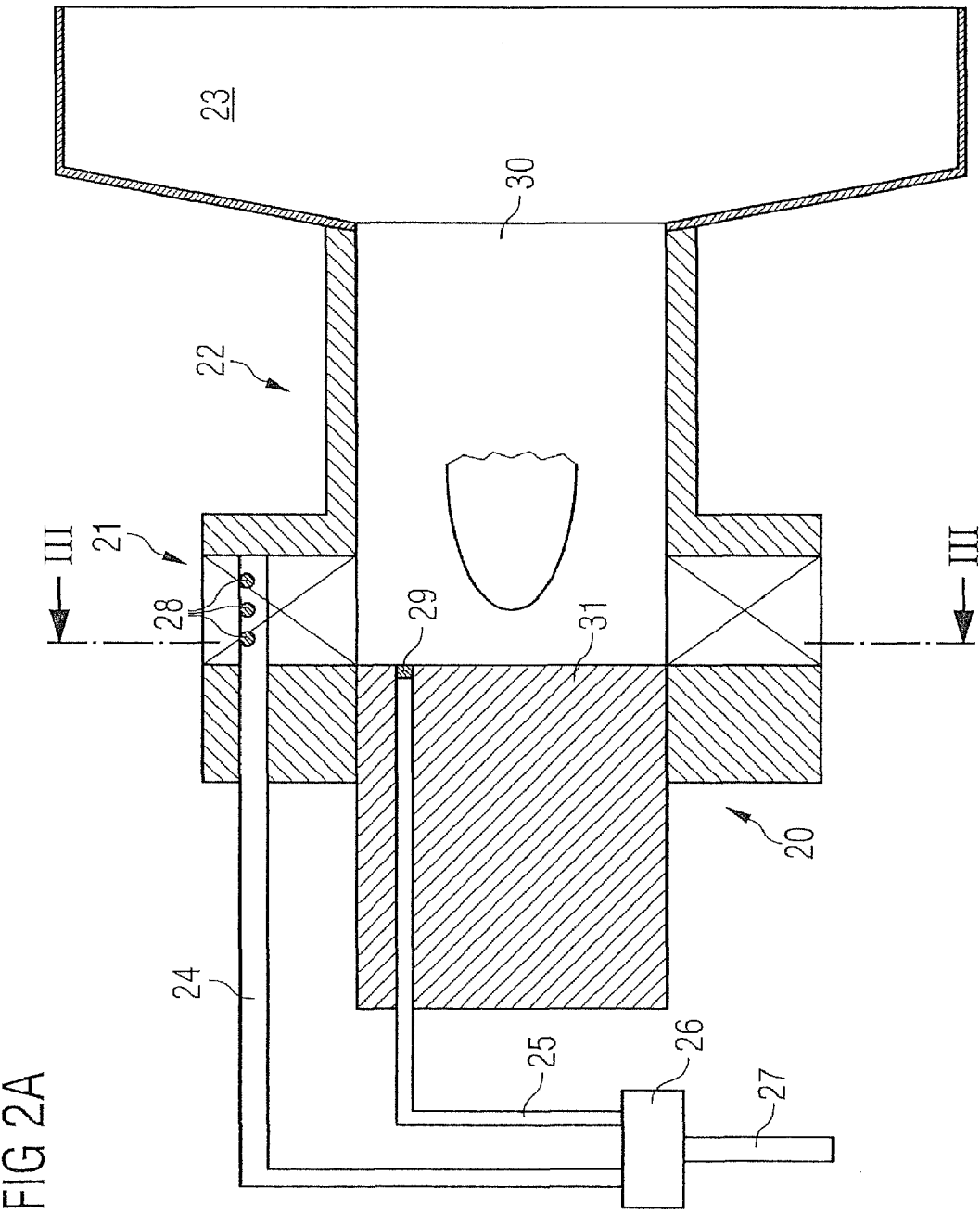

Prior Art

Prior Art

FUEL RATIO CONTROL IN A COMBUSTION APPARATUS WITH MULTIPLE FUEL SUPPLY LINES

CROSS REFERENCE TO RELATED APPLICATIONS

This application is the US National Stage of International Application No. PCT/EP2006/069494, filed Dec. 8, 2006 and claims the benefit thereof. The International Application claims the benefits of United Kingdom application No. 0601038.3 GB filed Jan. 19, 2006, both of the applications are incorporated by reference herein in their entirety.

FIELD OF INVENTION

The invention relates to a combustion apparatus and to a combustion apparatus constituted in particular by a gas turbine.

BACKGROUND OF INVENTION

Combustion apparatus is employed in a number of different environments, including gas turbines, furnaces and boilers.

An example of a typical gas-turbine arrangement is shown in FIG. 1. The gas turbine comprises an air inlet 10 at one end followed by a compressor stage 11 in which incoming air is compressed for application to one or more combustors 12, which are distributed circumferentially around the turbine axis 13. Fuel is introduced into the combustors at 14 and is there mixed with a part of the compressed air leaving the compressor stage 11. Hot gases created by combustion in the combustors are directed to a set of turbine blades 15, being guided in the process by a set of guide vanes 16, and the turbine blades 15 and the shaft forming the axis 13 are turned as a result. The turbine blades 15 in turn rotate the blades of the compressor stage 11, so that the compressed air is supplied by the gas turbine itself once this is in operation.

Part of a typical combustor is shown in FIG. 2A. (FIG. 2B is a section along a line III-III shown in FIG. 2A.) The combustor is in four parts: a front-end part 20, a swirler part 21, a burner pre-chamber part 22 and a combustion volume 23. Main fuel is introduced into the swirler 21 by way of the front-end part 20 through a conduit 24, while pilot fuel enters the burner space through a conduit 25 having at its end a pilot-fuel nozzle 29. The main and pilot fuel-flows are derived from a fuel-split valve 26, which is fed with a fuel supply 27 representing the total fuel supply to the combustor. The main fuel flow enters the swirler through a set of main-fuel nozzles (or injector) 28, from where it is guided along swirler vanes 30, being mixed with incoming compressed air in the process. The resulting air/fuel mixture maintains a burner flame 30. The hot air from this flame enters the combustion volume 23. A gas turbine will often comprise a number of such combustors, in which case the main and pilot fuel-flow distribution will usually be as shown in FIG. 3.

SUMMARY OF INVENTION

It is a common problem that, due to the high temperatures generated inside such combustors, various component parts of the combustors run the risk of overheating, which can seriously damage the combustor, or at least impair its performance. It is an aim of the invention to provide a combustion apparatus which reduces the risk of such overheating.

In accordance with a first aspect of the present invention there is provided a combustion apparatus comprising: a fuel supply line to the apparatus; at least one burner including a plurality of fuel-supply lines to the at least one burner, the supply of fuel in the plurality of fuel-supply lines to the at least one burner corresponding to the supply of fuel in the fuel supply line to the apparatus; a combustion volume associated with the at least one burner; a temperature sensor located in the apparatus such as to be able to convey temperature information relating to a part of the apparatus which is to be protected against overheating, and a control arrangement arranged to vary, dependent on the temperature sensed by the temperature sensor, the fuel supplies to one or more of the at least one burner such as to maintain the temperature of said part to be protected below a predetermined maximum limit, while keeping the fuel supply in the fuel supply line to the apparatus substantially constant.

The plurality of fuel-supply lines may comprise a first, main fuel-supply line and a second, pilot fuel-supply line to each of the at least one burner. Alternatively, the first and second fuel-supply lines may be first and second main fuel-supply lines to each of the at least one burner.

The control arrangement may be arranged to vary the ratio of fuel supplies in the first and second fuel-supply lines in at least one of the at least one burner, while keeping the total fuel supply to that burner substantially constant. Alternatively, the apparatus may comprise a plurality of burners and the control arrangement may be arranged to vary the ratio of fuel supplies in the first and second fuel-supply lines in one burner, while allowing the total fuel supply to that burner to vary, the variation of the total fuel supply to that burner being compensated by a corresponding opposite variation in the total fuel supply to another one or more burners.

The combustion apparatus may be a gas turbine engine and the combustion volume may comprise a combustion volume of the gas turbine engine. Alternatively, the combustion apparatus may be a boiler or a furnace.

The temperature sensor may be located on or in the part to be protected, which may be any of: a front face of the at least one burner, a wall of a pre-chamber of the at least one burner, a wall of the combustion volume and a lance situated within a swirl chamber of the burner.

The temperature sensor may be located such as to be able to sense the temperature of gases entering the at least one burner. Alternatively, where the combustion apparatus is a gas turbine, it may be located at a downstream end of the combustion volume such as to be able to sense the temperature of a turbine vane of the gas turbine engine. As a further alternative, the temperature sensor may be located in a fuel-supply line to the at least one burner.

The combustion apparatus preferably includes a pressure sensor for sensing pressure variations within the combustion volume, the control arrangement being arranged to additionally vary the fuel supplies to one or more of the at least one burner such as to keep the pressure variations within the combustion volume below a predetermined maximum limit.

In a second aspect of the invention a method for controlling the ratio of fuel in first and second fuel-supply lines feeding a combustion apparatus comprises the steps of:

(a) determining if a value of a first parameter, which tends to move the operating point of the apparatus toward a first undesired region of operation, has exceeded a predetermined maximum limit;

(b) if so, changing said ratio such as to reduce the value of the first parameter below its predetermined maximum limit; if not, go to (c);

(c) determining if a value of a second parameter, which tends to move the operating point of the apparatus toward a second undesired region of operation, has exceeded a predetermined maximum limit;

(d) if so, changing said ratio such as to reduce the value of the second parameter below its predetermined maximum limit; if not, go to (e);

(e) repeat (a) to (d) such as to maintain the values of the first and second parameters below their respective predetermined maximum limits.

The apparatus may supply a load and the method may comprise the further steps of:

(i) determining if the load is above a level at which it is desired to carry out steps (a) to (e);

(ii) if so, proceeding with step (a); if not, providing a default value of said ratio and going to (i).

The method may comprise the further steps of:

(iii) determining if either of the values of the first and second parameters have exceeded their respective predetermined maximum limits;

(iv) if so, going to (a); if not, going to (v);

(v) determining if said ratio was changed during a previous iteration of steps (a) to (e);

(vi) if so, retaining the changed ratio and going to (i); if not, providing said default value of said ratio and going to (i).

The method may further comprise monitoring the values of one or more further parameters; comparing those values with predetermined maximum limits of those values and, if these predetermined maximum limits are exceeded, influencing the operating point of the apparatus so that it moves further toward a predetermined one of the first and second regions.

The first parameter may be the temperature of a part of the apparatus to be protected from overheating, and the second parameter may be the amplitude of pressure variations within a combustion area of the apparatus. A further parameter may also be included. This further parameter may, for example, be the level of emissions from the apparatus, the method then being such that the influence of the further parameter counterbalances to a predetermined degree the influence of the second parameter.

BRIEF DESCRIPTION OF THE DRAWINGS

Embodiments of the invention will now be described, by way of example only, with reference to the drawings, of which:

FIG. 2A is longitudinal section of a typical combustor and FIG. 2B is a section along line III-III in FIG. 2A;

DETAILED DESCRIPTION OF INVENTION

The present inventors have recognised that it is possible to prevent over-heating of a component part of a combustion apparatus due to the combustion process in the combustion area by varying the main/pilot fuel supplies to the combustor without varying the overall fuel supply to the apparatus. It is normally desirable to maintain a constant total fuel supply to a combustor (or set of combustors, where there is more than one) in order to match a constant load imposed on the apparatus, which may be, for example, a gas turbine. Where the load on the gas turbine changes, it will then be necessary to change the total fuel supply to the gas turbine, but not otherwise, normally.

Figure 2B:
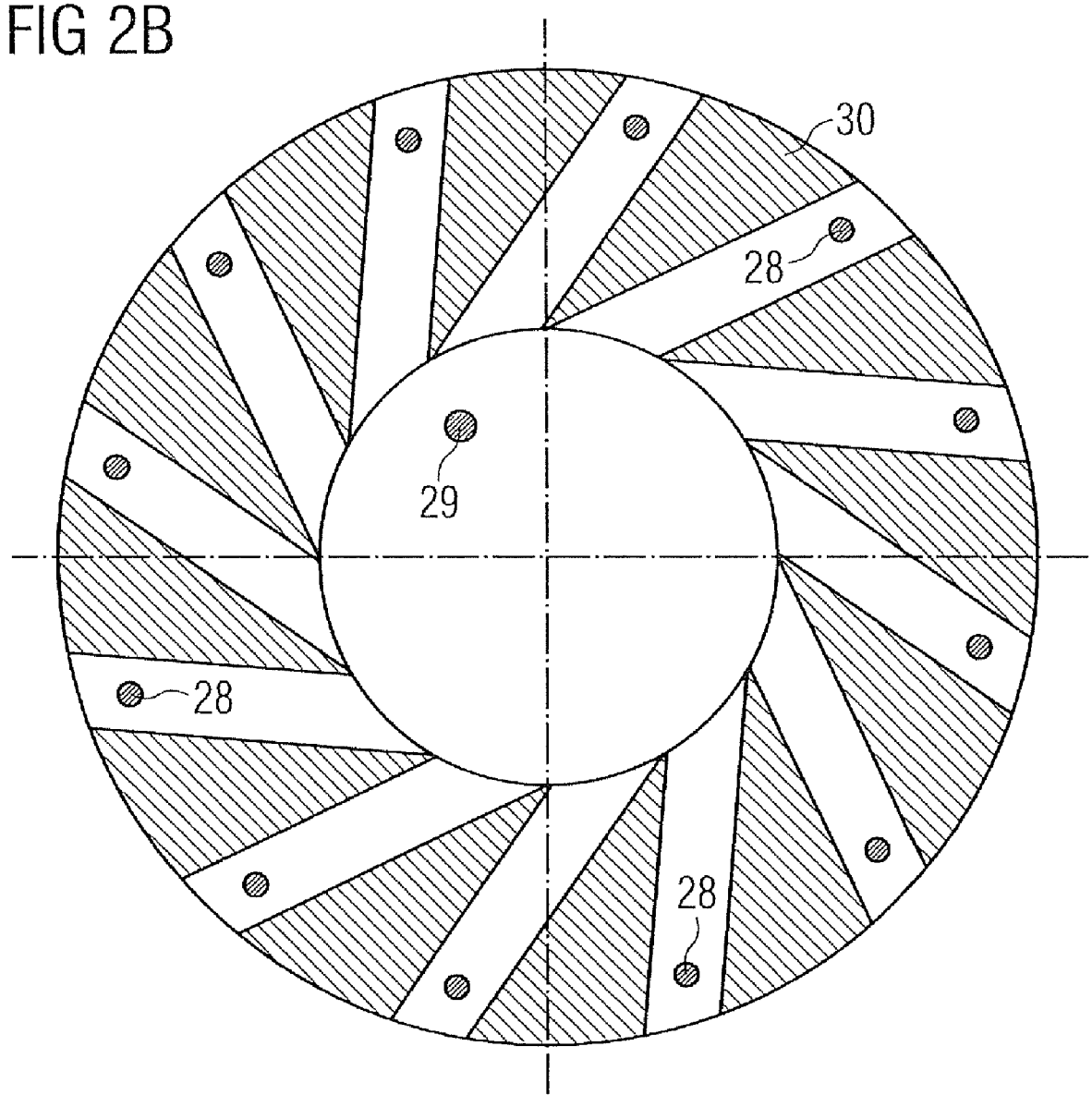
Figure 3:
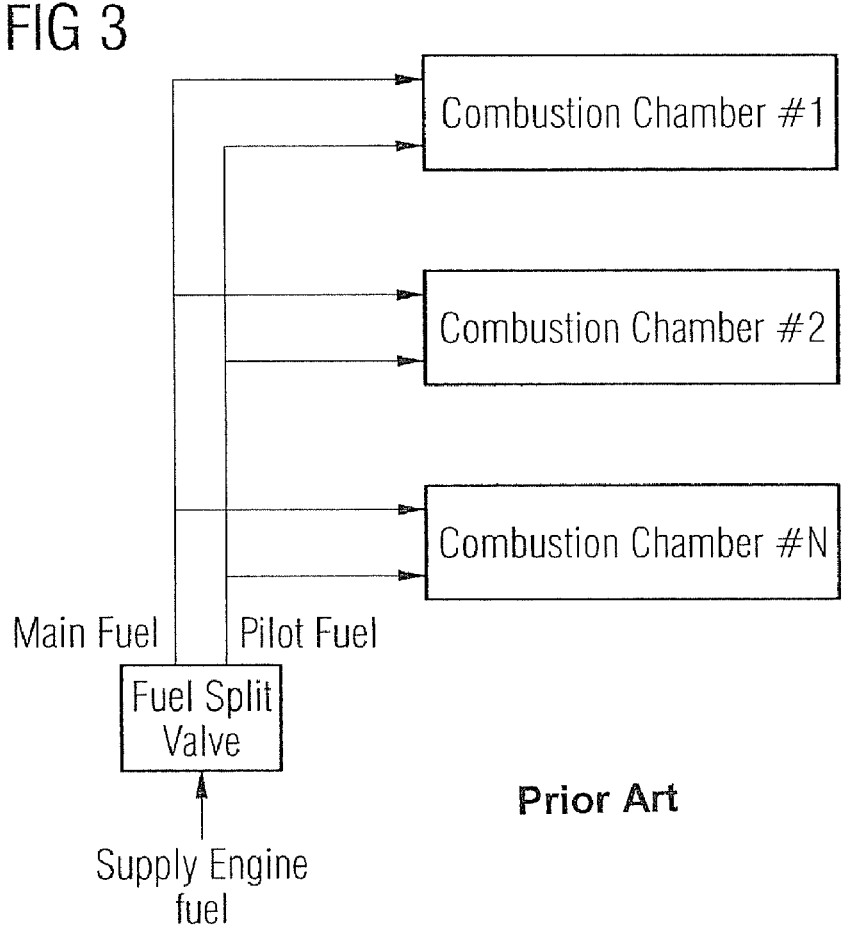
FIG. 3 is a block diagram illustrating the derivation of main and pilot fuel supplies in a typical gas turbine with multiple combustors.
Figure 4:
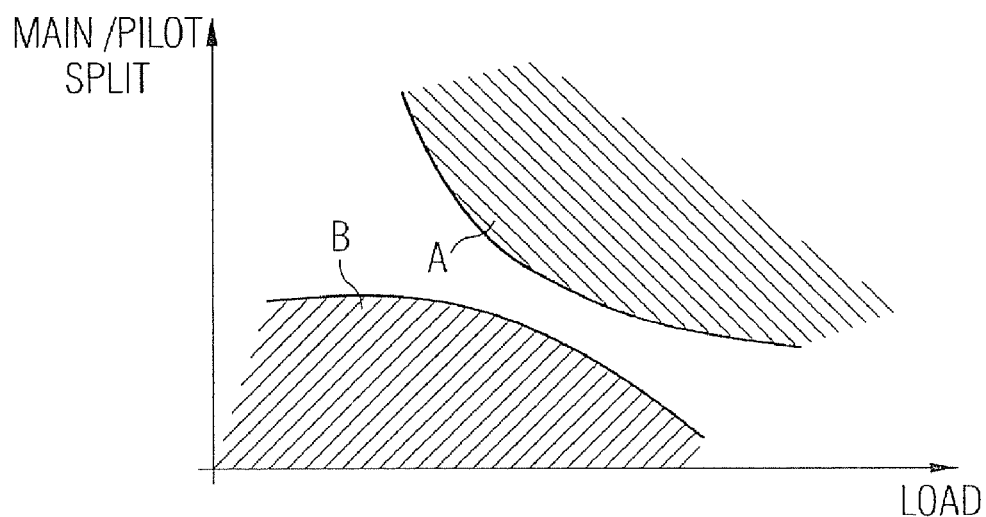
FIG. 4 is a graph plotting main/pilot fuel split for different values of load, as relevant to the present invention.
Figure 5:
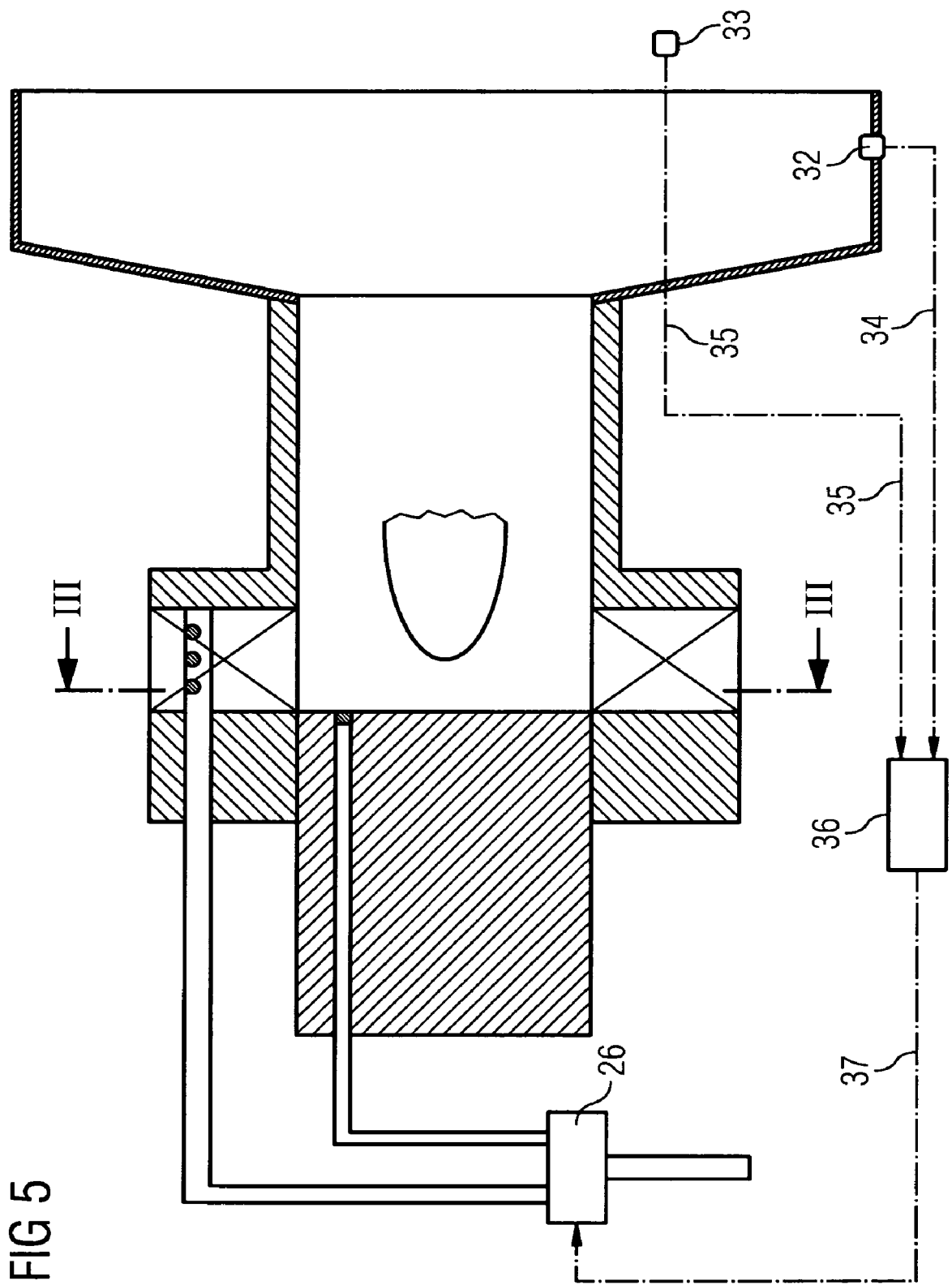
FIG. 5 is one example of temperature and pressure sensor placing in a combustion apparatus in accordance with the invention.

The concept behind the present invention is illustrated in FIG. 4, which is a graph of load versus main/pilot fuel split. In the graph the hatched area shown as A represents a set of operating conditions in which a component part of a combustor is in danger of suffering damage due to overheating. Hence the invention strives to derive, for a given load, a division (split) between the main and pilot fuel-flows such that area A is avoided. At the same time the invention strives to keep operation away from an area B. For one specific case, the area B represents a set of operating conditions in which the amplitude of dynamic pressure oscillations in the combustion area is undesirably high. When such dynamic pressure oscillations exceed acceptable levels, the operation of the gas turbine and/or the mechanical longevity of the combustion system can be severely impacted. Hence it is desirable also to be able to keep away from area B as well as area A. The frequency of the dynamic pressure oscillations depends on the geometry of the combustor and the characteristics of the acoustic system of which it is a part and may range from below 100 Hz up to several kHz. In order to achieve appropriate variation of the main/pilot fuel-flow split, both the temperature of an appropriate point associated with the combustor and the pressure oscillations are monitored by means of sensors. Referring now to FIG. 5, which corresponds to FIG. 2A, the temperature and pressure oscillations in this combustor arrangement are measured by placing, firstly, a temperature sensor 32 on a life-critical part of the combustor and, secondly, a pressure sensor 33 within the combustion volume 23. In this example the life-critical part is the circumferential wall defining the combustion volume 23. The outputs 34 and 35 from the two sensors are taken to a control unit 36 and an output 37 of the control unit controls the ratio of main and pilot fuel through the valve 26.

The control unit 36 contains processing apparatus to carry out an algorithm suitable for keeping the operation of the gas turbine inside the safe area between areas A and B in FIG. 4. An example of such an algorithm is given in FIG. 6 and will now be described.

At the start of the routine a number of data are input in step 100. These are:

(1) an "alarm limit", F, which represents the number of alarm flags to be received within a specified time window G before action is taken to change the split between main and pilot flow to the burner;

(2) a "time window", G, which is the time (in ms) over which the above alarm flags are to be received;

(3) a parameter "Activation Load", which corresponds to the engine load above which it is considered that it is necessary to run the control part of the algorithm;

(4) a parameter X MAX Limit, which is the maximum value, D, of a critical parameter that could move the operating condition of the engine into one of areas A and B of FIG. 4), and (5) a parameter Y MAX Limit, which is the maximum value, E, of another critical parameter that could move the operating condition of the engine into the other of areas A and B of FIG. 4).

It is assumed here that, as in the example given earlier, X MAX Limit relates to the amplitude of pressure oscillations and that Y MAX Limit relates to the temperature of a life-critical component. However, other parameters are possible (one example is the level of emissions (e.g. NOx) given off by the combustion apparatus), provided these parameters tend to push the operating condition in opposite directions, i.e. into area A on the one hand and area B on the other.

In step 102 the timer and flags (FlagX and FlagY) relating to the two parameters X and Y are initialized with value zero and in step 104 the calculated engine load is sampled. In step 106 a decision is made as to whether or not this load is lower than the threshold C at which it is considered worth altering the main/pilot flow split. If it is lower, no alteration takes place and the default engine fuel-flow split map is followed (see step 108). The procedure is then repeated from box 102. On the other hand, should the sampled load be higher than C, then processing passes to step 110. In step 110 the outputs of sensors 33 and 32, respectively, are read and in step 112 a decision is made as to whether the output of pressure sensor 33 has a value higher than value D or whether the output of temperature sensor 32 has a value higher than E. If either of these conditions is true, then the active pilot control program is activated, otherwise it follows step 114. In step 114, the pilot flow split map is checked for any change from the default setting. In the case where the flow split map was altered during a previous iteration of the active pilot control part of the algorithm, the flow split is retained in step 116, as required in step 126 or 138 for a constant load. The procedure is then repeated from step 102. If the flow split was not changed from the default setting, then the sensor outputs (temperature and pressure parameters) are assumed to be out of range and the active pilot control software is not activated. Consequently the default fuel-split map for the engine is followed (step 108).

In the case where, as part of a previous iteration of the algorithm, the pilot flow split was altered in order to avoid regions that could limit the life of a component (regions A and B in FIG. 4), then the split is retained for a constant load. If the load is gradually changing, reading X or Y could exceed its limits, in which case the split will be altered to reduce parameter X or Y, as described in greater detail below. As a result of this, readings X and Y might not exceed their respective limits D and E, in which case the altered split is retained in step 116. During conditions of load-up, when the load has exceeded its limit value C (step 106), but the X, Y parameters have not exceeded their limit values D, E (step 112), the engine follows the default pilot split map.

Assuming the active pilot control part of the algorithm is activated, the output of the pressure sensor that was read in step 110 is compared with parameter D (maximum X limit) in step 118. If value D is exceeded, it is assumed that operating conditions are within area B of FIG. 4 and therefore an alarm flag is incremented by 1 in step 120 (it assumes the value 1, since in step 102 the flag was reset to zero) and the timer, which had likewise been reset to zero, starts to count in increments of milliseconds. In step 122 a decision is taken as to whether or not the number of alarm flags has reached the maximum value F set in step 100. If not, a check is made in step 124 as to whether or not the value of the timer has reached value G. If not, control passes back to step 104. If so, on the other hand, both the timer and the two flags are reset to zero in step 125 and control passes back to step 104. In the event that the alarm limit has been reached in step 122, the main/pilot flow split is incremented in step 126, the timer and the X-flag are both once again reset to zero (step 128) and control passes back to step 104. It is assumed here that the particular engine environment in which this routine is being carried out is such that the main/pilot flow split has to be incremented, as opposed to decremented, in order to raise the operating conditions out of area B. In some environments the opposite might be the case.

If in step 118 it is decided that the value of parameter X is not too high (i.e., that value D has not been exceeded), then the active pilot control program passes from its X-parameter-assessing phase (steps 118-128) to its Y-parameter-assessing phase (steps 132-140). Now the output of the Y-parameter sensor that was sampled in box 110 is checked and, if this value exceeds value E (see step 132), then in step 134 the alarm flag is incremented by 1 and the timer is started to count in ms, as last time. At this point, if the alarm limit has been reached (step 136), the same procedure is followed involving steps 138 and 140 as was followed in the case of steps 126 and 128, except that this time the main-pilot flow split is changed in the opposite direction. As shown, this means that the split is decremented instead of incremented. Should the result of step 136 be that the alarm limit A has not been reached, steps 124 and 125 are performed, as before, and control is once again passed back to step 104.

Figure 6:
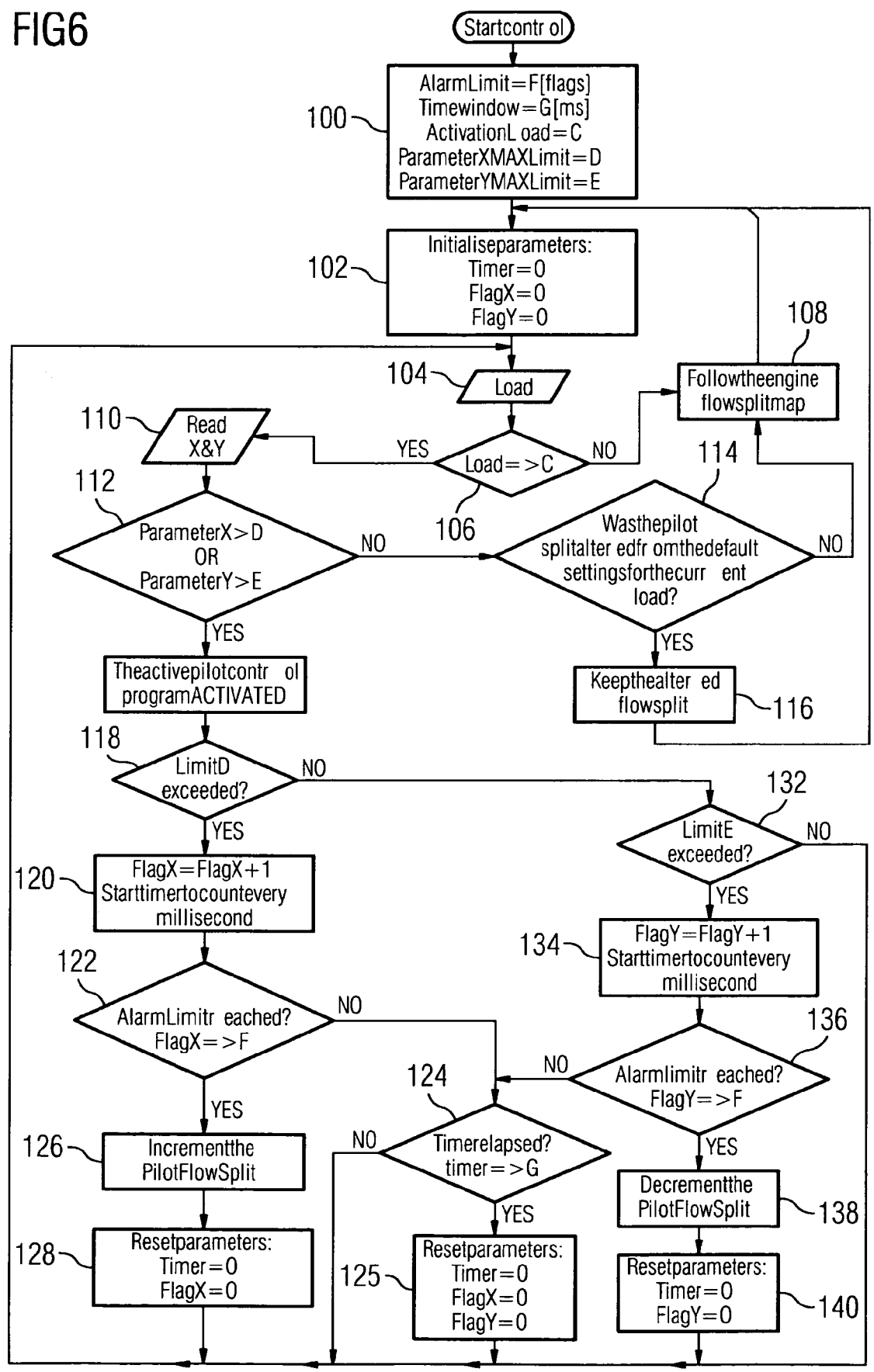
FIG. 6 is a flow chart illustrating a control algorithm which may be employed in the present invention.

It has already been mentioned that, when the timer and alarm flags have been set to zero in any of steps 128, 125 and 140 in FIG. 6, control passes back to step 104. This is in order to recheck the load. If the load is less than value C in step 100, which could occur in, for example, a load-shedding situation, then there is no need to proceed with the active pilot control part of the algorithm.

Figure 7:
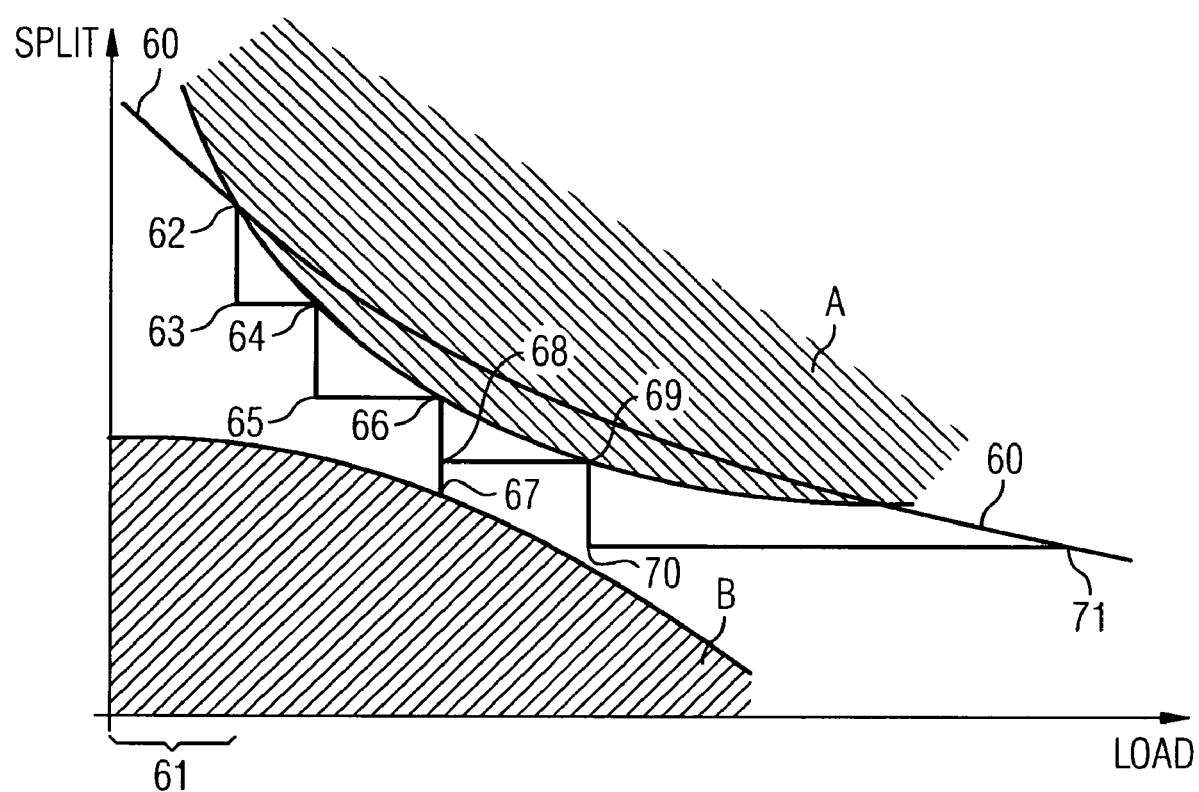
FIG. 7 is an exemplary diagram illustrating the effect of the algorithm shown in FIG. 6, and FIGS. 8-15 are further examples of temperature and pressure sensor placing in a combustion apparatus according to the invention.

An illustrative example of the active-pilot control that has just been described is shown in FIG. 7 which, like FIG. 4, is a fuel-split v. load diagram involving areas A and B which are to be avoided. In FIG. 7 it is assumed that the default split is as shown in curve 60. In this case, during lower values of load 61, which are nevertheless still greater than limit value C in FIG. 6, the default map is followed, since the result of steps 112 and 114 is "no". This is step 108. At some point, however, the load rises such as to start to encroach on area A. This is shown as point 62 in FIG. 7. Under these circumstances parameter X will not exceed value X, but parameter Y will exceed value E (step 112). As a result the active pilot control is started and the split is decremented only (step 138) to an assumed point 63. During a subsequent iteration neither X nor Y exceed their limits, so that the result of step 112 is "no". The result of step 114, however, is "yes", since the split has fallen from its default value at 62 to a non-default value at 63. Consequently in step 116 this same split at 63 is retained. In subsequent iterations conditions stay the same, until the load rises such that the split starts again to encroach into area A (point 64). Once again in step 112 parameter Y is found to exceed its limit, whereas parameter X is not. This results in a further decrementing of the split in step 138 to a lower value at point 65. During the next iteration the result of step 112 is again "no", the result of step 114 is "yes" and the same split is retained in step 116. A further decrementing is performed when the load causes the split to get too close to region A at point 66. The split is this time reduced to a point 67. During the next iteration it is found that parameter Y is lower than its limit, but X has exceeded its limit. Consequently the result of step 112 is "yes" and the split is incremented, but by a smaller amount, in step 126 to a point 68. This is retained until, for a higher value of load, the split causes the temperature parameter Y to exceed its limit at point 69. The split is therefore decremented to a lower value at point 70. Since this new split value does not cause parameter X to exceed its limit, this same value of split is retained until, at point 71, the load has increased such that this new value of split coincides with the default split. At this point the result of step 114 is "no" and the default split is followed in step 108.

Figure 8:
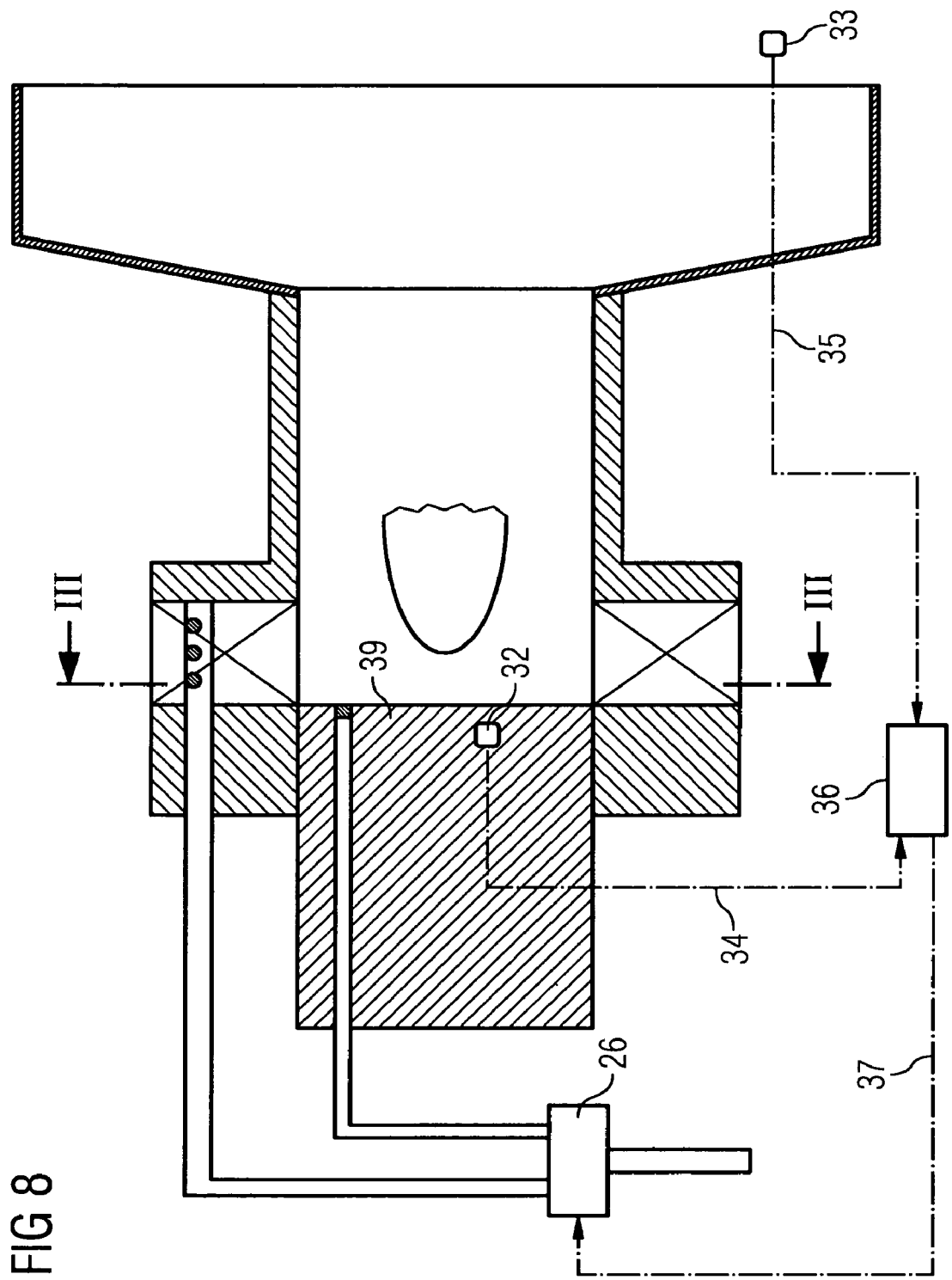

One example of the placing of the temperature and pressure sensors has already been shown in FIG. 5. FIGS. 8-15 illustrate a number of possible locations for these sensors in order to provide the information necessary for the algorithm. In FIG. 8 the pressure sensor 33 is located in the same region of the combustion volume as was the case in FIG. 5. The temperature sensor 32, however, is embedded behind the front face 39 of the combustor. Hence the component being protected from overheating in this case is the front face of the combustor.

Figure 9:
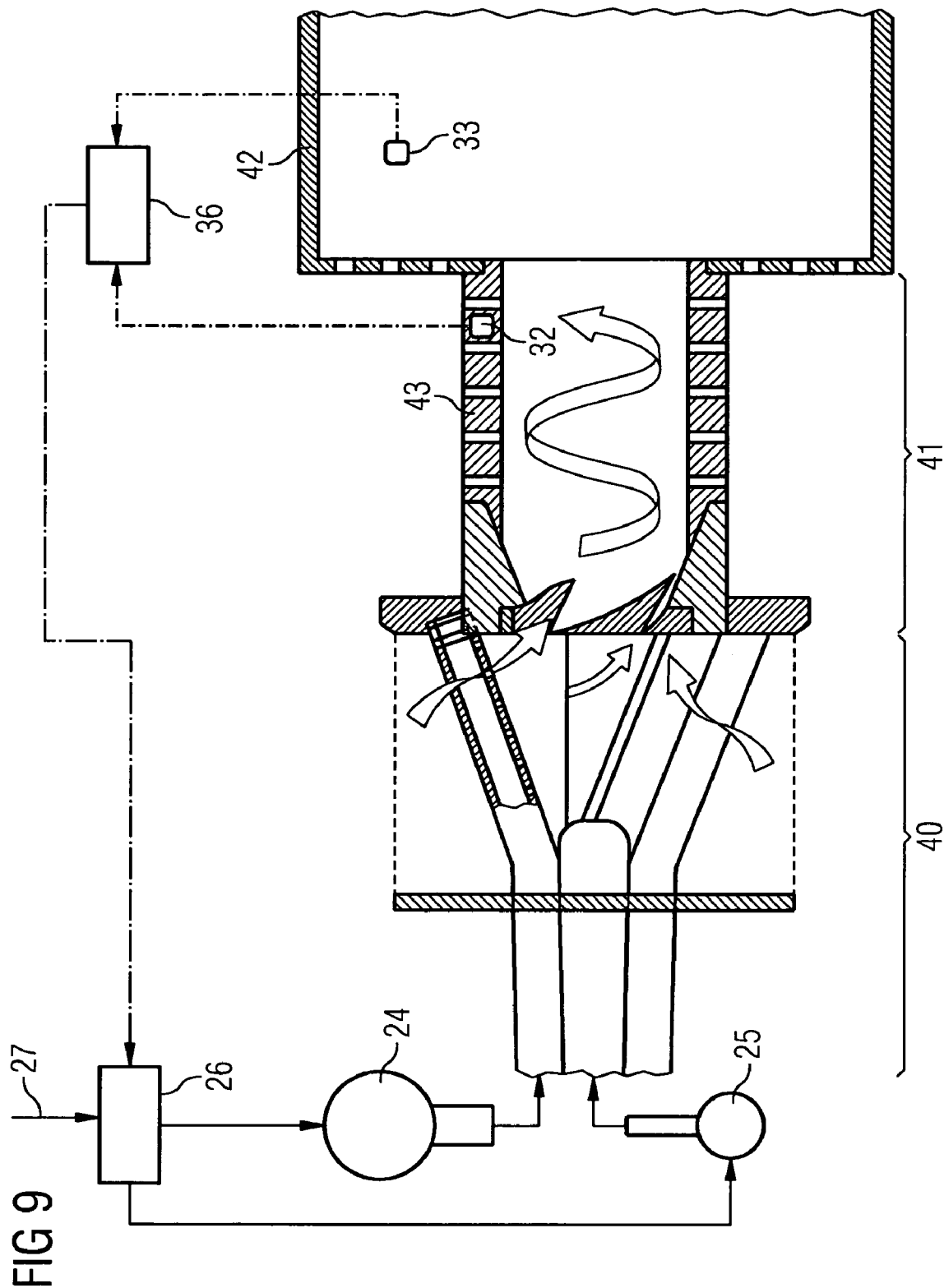
Figure 10:
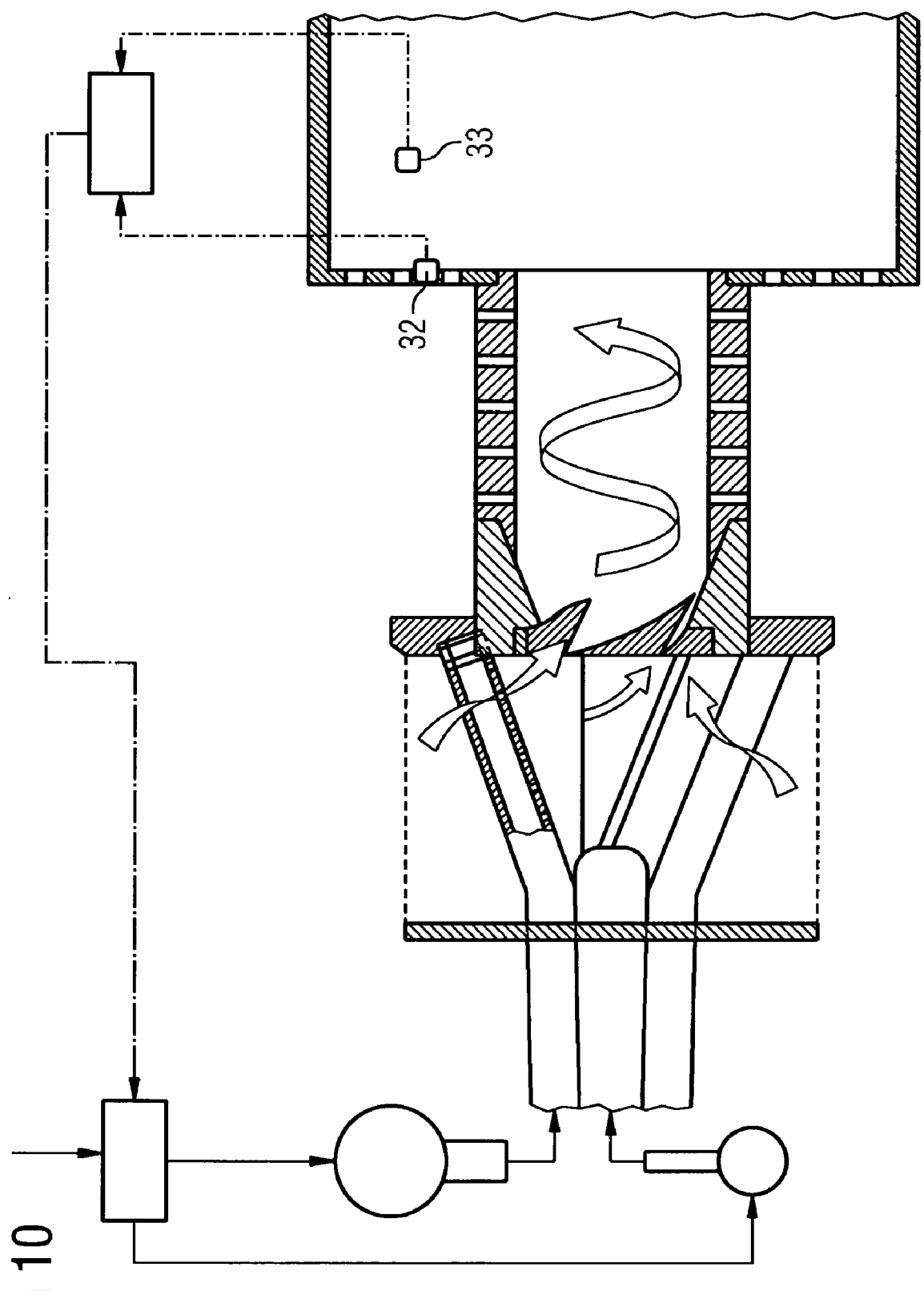

FIGS. 9 and 10 show two different locations for the temperature sensor 32 in a combustor disclosed in a published European patent application, number EP 0899506, filed in the name of ABB Research Ltd. In these figures the combustor comprises a swirl generator stage 40 followed by a pre-chamber stage 41 followed by a combustion volume 42. The main-flow and pilot-flow conduits are, as before, conduits 24 and 25, respectively, while the flow-split valve is valve 26 and the incoming fuel supply to the combustor is supply 27. In FIG. 9 the temperature sensor 32 is embedded in the wall of the pre-chamber 43, while in FIG. 10 the same sensor is located in a front wall of the combustion volume 42. Hence in these two cases the components being protected from overheating are, respectively, the pre-chamber wall and front wall of the combustion volume. The pressure sensor 33 is, as in FIGS. 5 and 8, located in an upstream part of the combustion volume 42.

Figure 11:
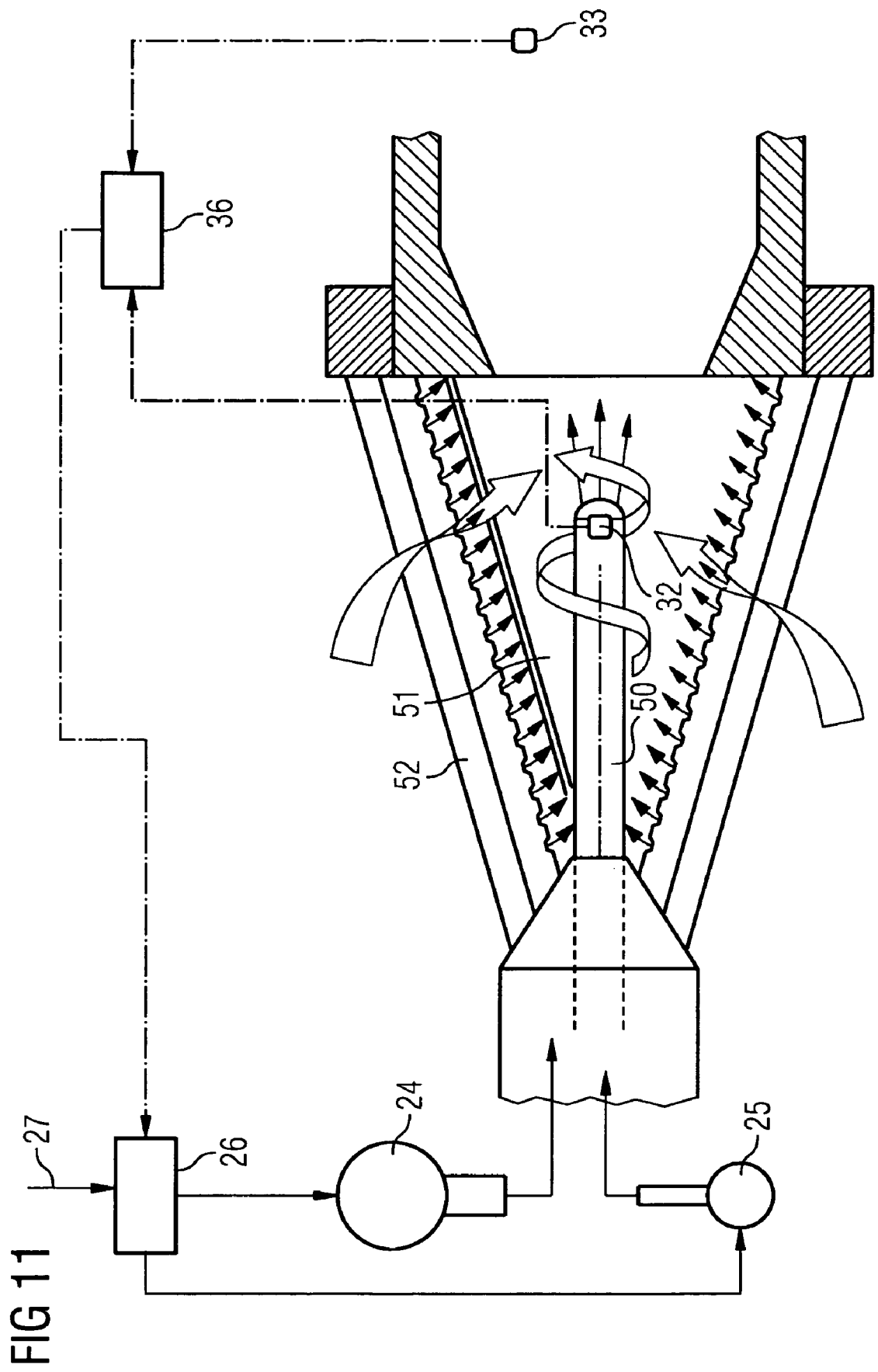

FIG. 11, which is taken from published patent application number EP 1510755, filed in the name of Alstom Technology Ltd, shows yet another possible location for the temperature sensor 32. This is at the end of a burner lance 50 located within a swirl chamber 51. In this arrangement the first fuel supply from conduit 24 flows through the annular cavities of a swirl generator 52, where it is introduced into the chamber 51, while the second fuel supply from conduit 25 flows through the lance 50, from whose tip it emerges together with air. The temperature sensor is preferably located at the lance tip, since it is this part of the lance which will be most prone to overheating. As before, the pressure sensor 33 is situated in the combustion volume downstream of the swirl generator.

Figure 1:
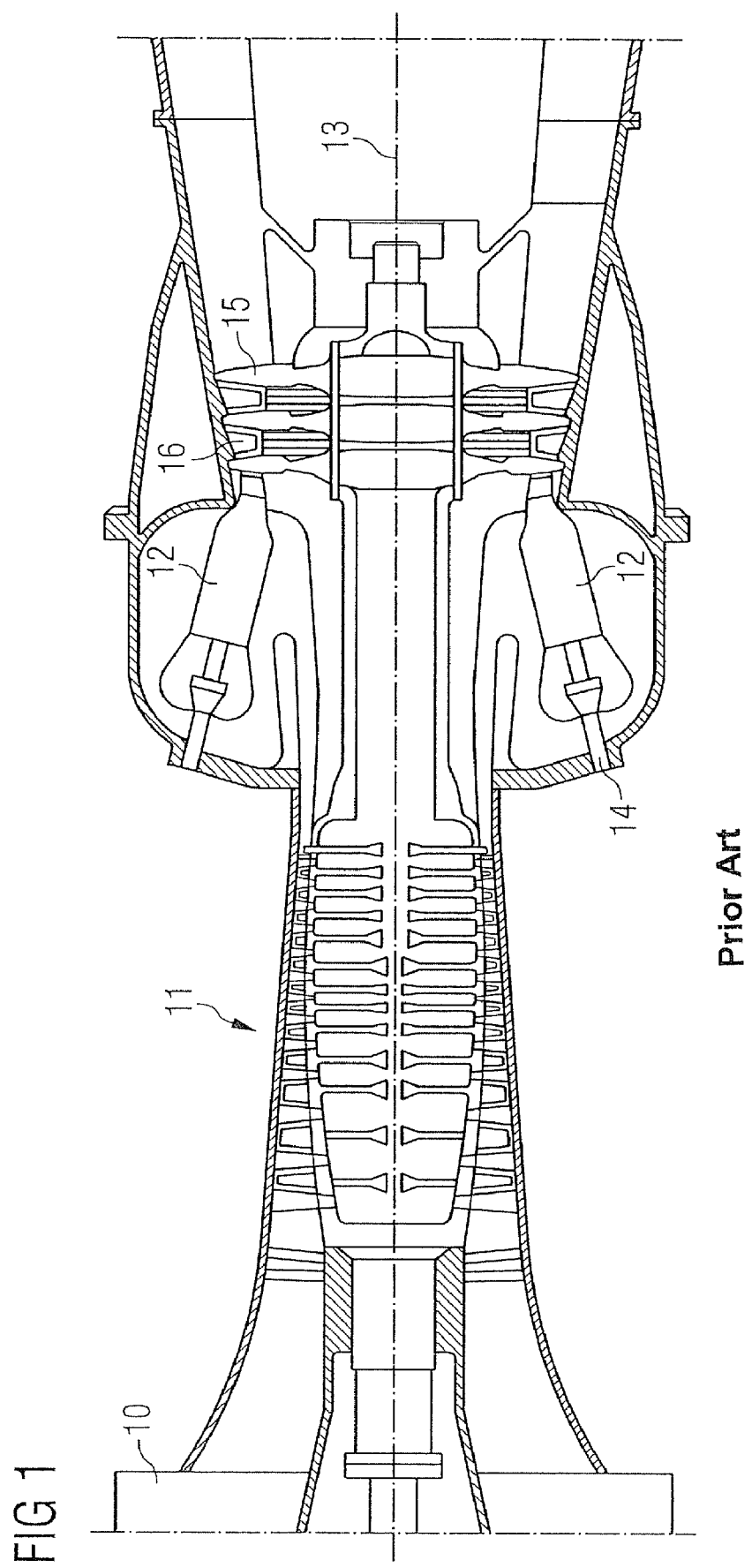
FIG. 1 is a longitudinal section of a typical gas turbine.

In all the examples shown in FIGS. 5, 8, 9, 10 and 11 the temperature sensor has been mounted in or on the component being monitored for overheating. Alternatively, however, it is possible to mount the sensor separately from the component itself, but in a place in which it can nevertheless form an equivalent measurement of the component's temperature. Three examples of this are given in FIGS. 12-14, which are based on the combustor 12 shown in FIG. 1.

Figure 12:
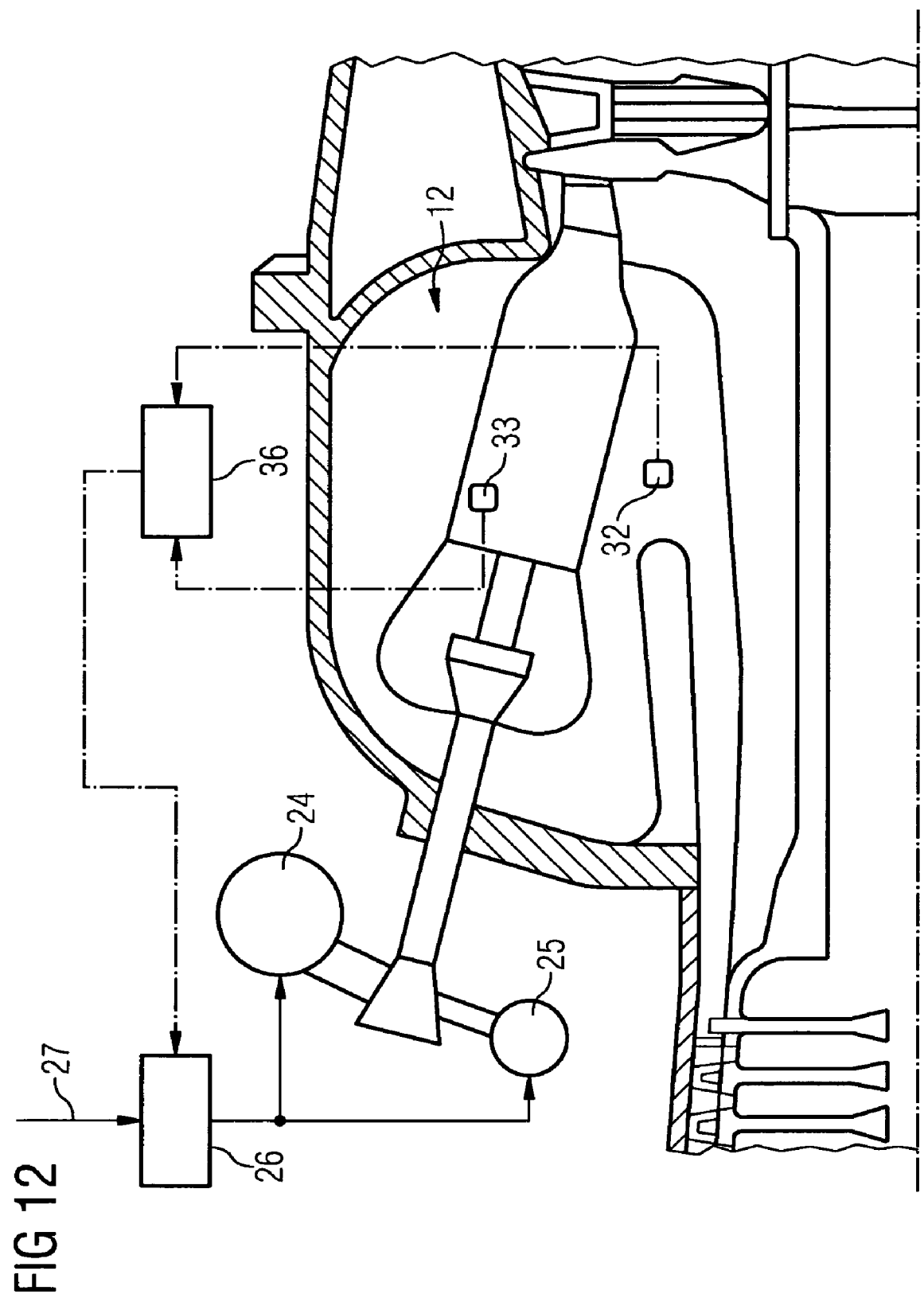

All three examples feature the main and pilot fuel conduits 24, 25, the fuel-split valve 26 fed with the total flow 27 to the burner, the temperature and pressure sensors 32 and 33 and the control unit 36. In the case of FIG. 12, the temperature sensor 32 is located outside the combustor 12 so as to be able to measure the temperature of the air in the compressor discharge area. The temperature sensor is in this case part of the standard instrumentation for control of the gas turbine. This arrangement allows components such as the burner and other parts of, or adjacent to, the combustor to be protected against overheating. One advantage with this arrangement is that the sensor is easily accessible and the signal already available. In this case the control is used to prevent high dynamic pressure oscillations from occurring, which in some systems has an effect on the location of the flame. This, in turn, can provide information on the metal temperature in a component. The pressure sensor 33 is located in an upstream part of the combustion volume, as before.

Figure 13:
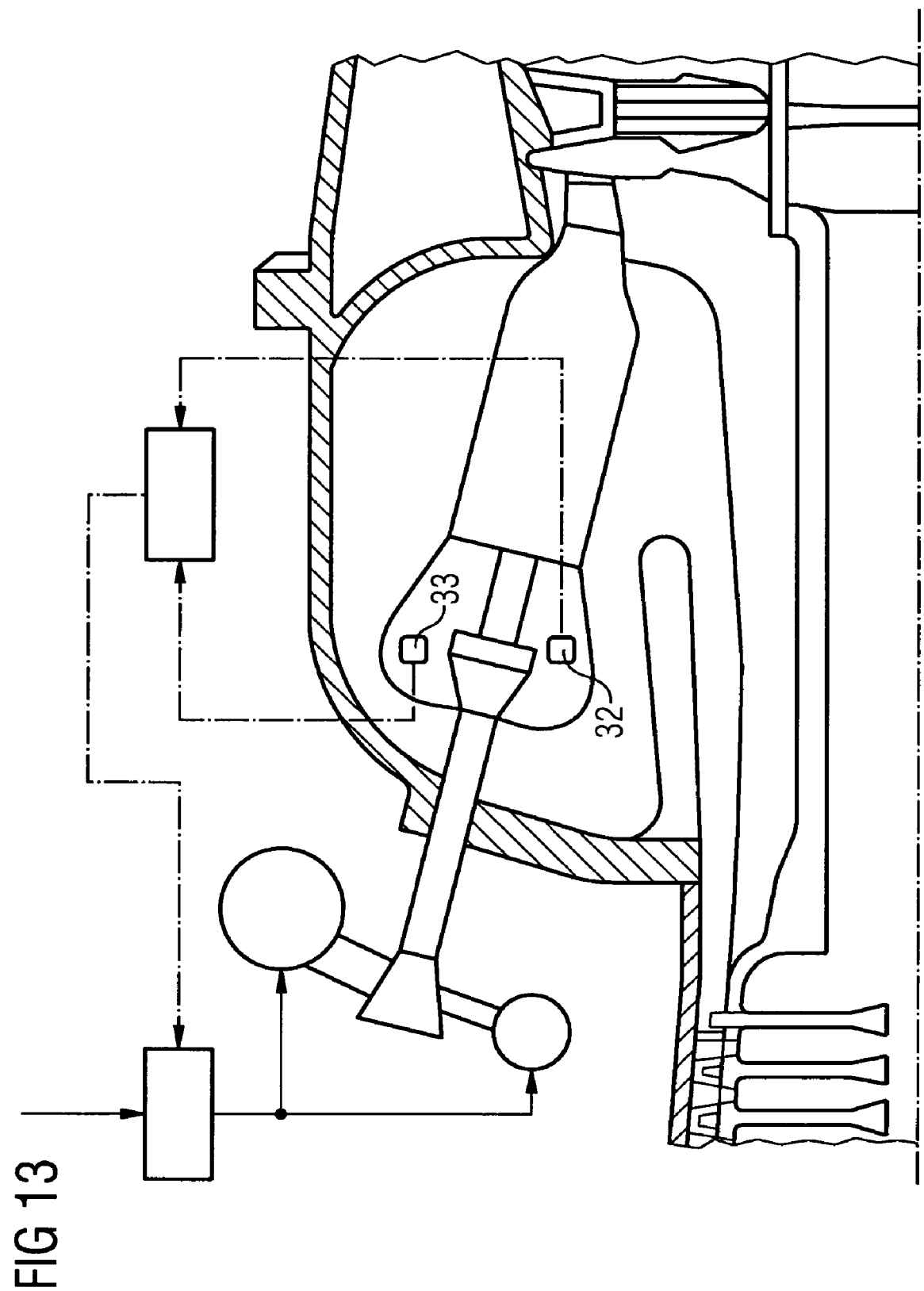

In FIG. 13 it is assumed that so-called regenerative cooling is applied to the combustor. In this case the temperature sensor 33 is located inside the hood of the combustor and downstream of the cooling air outlet, while the pressure sensor 33 may also be located within the hood space. The dynamic pressure oscillations appear as a flow changing direction with a certain frequency. Hence, depending on the acoustic characteristics of the system, the oscillation may be registered outside the combustion volume in a volume connected (through the burner) to the source of the oscillation, namely the heat released by the flame.

Figure 14:
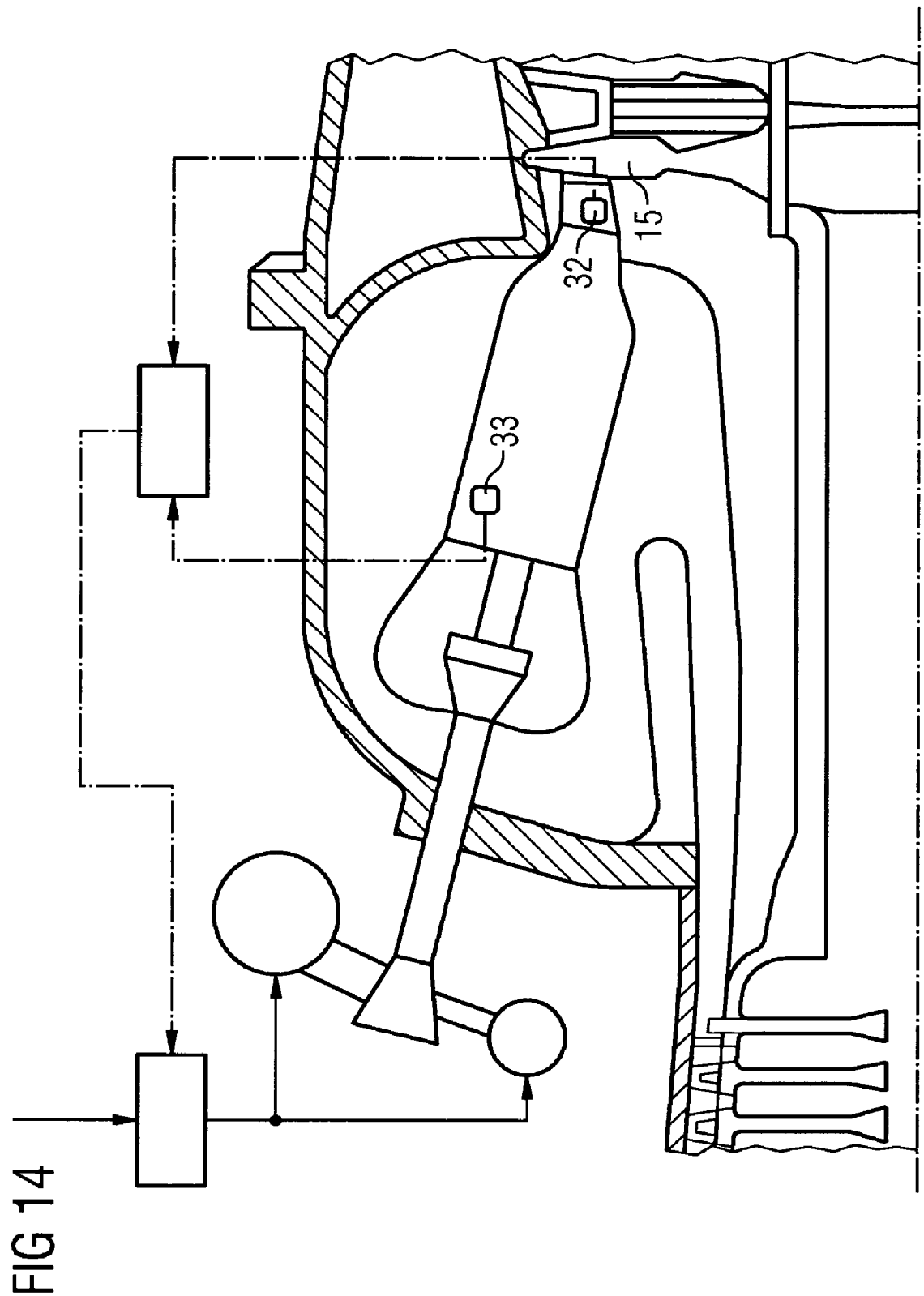

In FIG. 14 the temperature sensor 32 is located at the very downstream end of the combustion volume so as to form a measurement corresponding to the temperature of the first turbine vane 15, which in this case is the component to be protected. Two major factors determining the heat load of the turbine vane is the temperature profile exiting the combustion volume and the turbulent flow field generated by the combustor, which enhances the heat transfer on the vane surface. In a situation where the maximum temperature occurs in the most turbulent part of the flow from the combustion process, the impact on the vane will be significant. The temperature profile is affected by the fuel distribution and hence the split between pilot and main. A direct link can therefore be seen between the metal temperature on the surface of the vane and the setting of the fuel-split valve. The pressure sensor 33 is situated at the upstream end of the combustion volume, as in most of the earlier examples.

Figure 15:
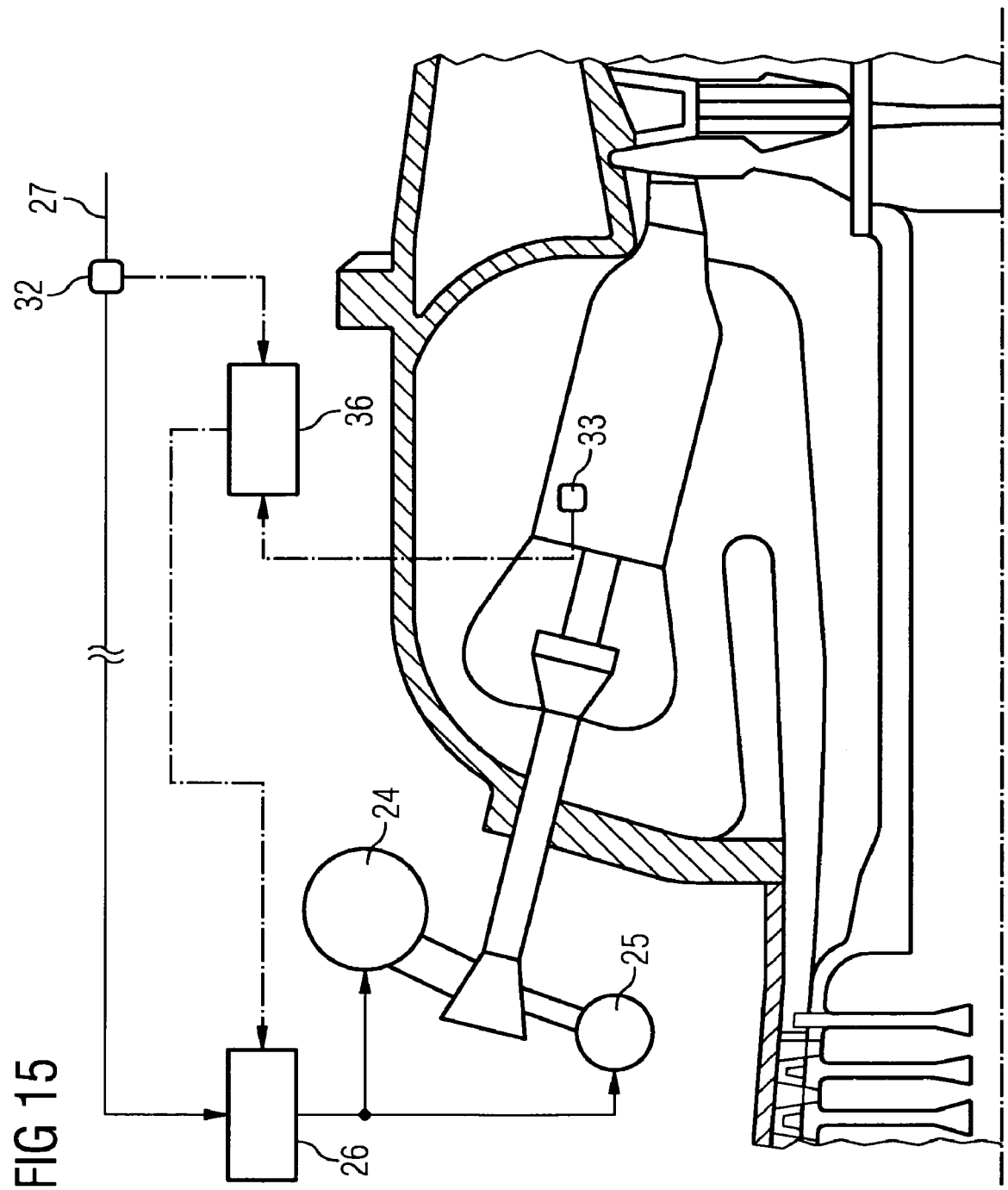

FIG. 15 illustrates yet another possible arrangement. In this arrangement the temperature sensor 32 is located such as to measure the temperature of the fuel supply 27 feeding the fuel-split valve 26. The pressure sensor is situated in the upstream part of the combustion volume. The principle behind this arrangement is not unlike that behind the FIG. 12 arrangement. In the combustion systems of both arrangements, pressure oscillations are triggered by a particular operating condition, more specifically a parameter such as the air temperature downstream of the compressor or the fuel temperature. When the pulsations start, this indicates that the flame has moved to a certain location in the combustor. This location in certain systems corresponds to increased heat transfer, which increases the metal temperature for the component to be protected. The algorithm therefore, through a monitoring of the fuel temperature, acts to move the flame back to a safer region.

It has so far been assumed that the fuel-split being controlled is that between main and pilot in a single burner. However, it is also possible to have more than one main supply to a combustor, in which case it may be possible to limit the use of the pilot considerably, or even do without it. In that event the present invention will control the split between the two or more main fuel supplies to the combustor, while keeping the total supply to the combustor constant, as mentioned earlier. Another possible scenario occurs when there is more than one combustor in a gas turbine. In that case it is envisaged that the split between main and pilot (or between two or more main supplies) in one combustor may involve a change in the total amount of fuel supplied to that combustor—i.e., the total amount is not kept constant—provided the total amount of fuel supplied to one or more of the other combustors is adjusted to compensate. This still means, therefore, that the total fuel supply to the whole combustion apparatus is kept constant for a particular load.

Whereas the invention has been described predominantly in connection with gas turbines, it may also be used in other combustion-related environments, such as furnaces or boilers.

It was mentioned earlier in connection with the algorithm of FIG. 6 that the two parameters being monitored were not necessarily those of temperature and pressure. Instead other "competing" parameters may be monitored and used as parameters X and Y in the algorithm. By "competing" is meant that the parameters have a "push-pull" effect on the operating condition, moving it nearer to area A on the one hand and nearer to area B on the other. One such parameter that may be monitored is that of emissions, e.g. NOx. Alternatively, the two main parameters may still be temperature and pressure, but one or more other parameters may also be monitored and used to influence the split. Again, NOx emissions is a possible example of such other parameters. In this case, referring again to FIG. 6, a further branch (branch "Z") could be added to the algorithm alongside the branch involving parameter Y. This could be achieved by taking the "no" branch from step 132 and feeding it to, say, a "limit H" step similar to steps 118 and 132. Limit "H" could be set in step 100, as with the other limits. A "yes" result from such a "limit H" step would feed a "FlagZ" step similar to the FlagX and FlagY steps 120, 134. This would increment FlagZ by 1 and start a third timer similar to the other timers. Again, an alarm decision similar to steps 122 and 136 could be tested which, if resulting in "yes", would decrement the pilot flow split to counterbalance the incrementing that may have been achieved in the "X" parameter branch. The rate of decrementing, however, might be different—most probably lower—than the decrementing rate of the "Y" branch. As with the "X" and "Y" branches, such a "Z" branch could feed the steps 124 and 125 in the event that the "alarm limit" flag had not reached its limit F. Where a decrementing did take place in the "Z" branch, the timer and FlagZ would be reset to zero, as in steps 128 and 140. The use of such a third branch would have the effect of preventing the operating point in FIG. 4 from being too far away from area B, which could increase NOx emissions.

The use of a third branch, as just described, depends on there being enough space between areas A and B in FIG. 4. Indeed, if these areas are very close together, it may be difficult to implement the active pilot control at all, even where this involved just the first and second parameters. In that case, an extra flag could be introduced, which prevented active pilot control from occurring. In that event, the default split map could be followed. A way of implementing this in FIG. 6 is to, say, precede step 106 with a step 105 testing whether the proximity between the A and B regions was too great. A "yes" result would feed step 108, whereas a "no" result would feed the input of step 106. An alternative location for this extra flag could be prior to step 104 instead of 106.

Finally, although in FIG. 6 the algorithm has been described as determining first whether or not the amplitude of pressure oscillations has exceeded its limit and only subsequently whether or not the temperature has exceeded its limit, this could be reversed instead.

The invention claimed is:

1. A combustion apparatus, comprising:
   a fuel supply line to the apparatus;
   a burner including a plurality of fuel-supply lines to the burner, the supply of fuel in the plurality of fuel-supply lines to the at least one burner corresponding to the supply of fuel in the fuel supply line to the apparatus;
   a combustion volume associated with the at least one burner;
   a temperature sensor located in the apparatus such as to be able to convey temperature information relating to a part of the apparatus to be protected against overheating; and
   a control arrangement arranged to vary, dependent on the temperature sensed by the temperature sensor, the fuel supplies to the burner to maintain the temperature of the part to be protected below a predetermined maximum limit, while keeping the fuel supply in the fuel supply line to the apparatus substantially constant,
   wherein the plurality of fuel-supply lines comprises first and second main fuel-supply lines to each of the burner to protect against overheating of a part of the apparatus and reduce the risk of low frequency dynamics in the apparatus,
   wherein a value of an amplitude of pressure variations within a combustion area of the apparatus, which tends to move the operating point of the apparatus toward a second undesired region of operation with low frequency dynamics in the apparatus is determined, and
   wherein when the determined value of the amplitude exceeds the second predetermined maximum limit the ratio is changed to reduce the value of the amplitude of pressure variations below the second predetermined maximum limit to reduce the low frequency dynamics.

2. A method for controlling the ratio of fuel in first and second fuel-supply lines feeding a combustion apparatus to protect against overheating of a part of the apparatus and reduce the risk of low frequency dynamics in the apparatus, while keeping an overall fuel supply in the first and second fuel supply lines to the apparatus substantially constant, the method comprising the steps of:
   (a) determining when a value of a temperature of a part of the apparatus, which tends to move the operating point of the apparatus toward a first undesired region of operation with an overheated part, has exceeded a first predetermined maximum limit;
   (b) changing the ratio to reduce the value of the temperature below the first predetermined maximum limit to avoid said overheating, the changing when the determined value of the temperature exceeds the predetermined maximum limit:
   (c) determining when a value of an amplitude of pressure variations within a combustion area of the apparatus, which tends to move the operating point of the apparatus toward a second undesired region of operation with low frequency dynamics in the apparatus, has exceeded a second predetermined maximum limit, the determining of the amplitude value occurring when the determined value of the temperature does not exceeds the first predetermined maximum limit:
   (d) changing the ratio to reduce the value of the amplitude of pressure variations below the second predetermined maximum limit to reduce the low frequency dynamics, the changing when the determined value of the amplitude exceeds the second predetermined maximum limit; and
   (e) repeating steps a to d in order to maintain the values of the temperature and the amplitude of pressure below their respective predetermined maximum limits.

3. The method as claimed in claim 2,
   wherein the apparatus supplies a load, and
   wherein the method further comprises, prior to step a, the steps of:
   (i) determining when the load exceeds a level at which it is desired to carry out steps (a) to (e); and
   (ii) when the load does not exceed the level:
       providing a default value of the ratio, and returning to step (i).

4. The method as claimed in claim 3, further comprises, after the step (ii), the steps of:
(iii) determining when either of the temperature or the amplitude of pressure has exceeded their respective predetermined maximum limits;
(iv) when neither have exceeded their respective predetermined limits:
providing the default value of the ratio when the ratio was unchanged during a previous iteration of steps (a) to (e), and
returning to step (i);
(v) proceeding to step (a).

5. The method as claimed in claim 2, further comprises the steps of:
monitoring a value of a further parameter;
comparing the value with a predetermined maximum limit of the value,
influencing the operating point of the apparatus so that it moves further toward a predetermined one of the first and second regions when the predetermined maximum limit is exceeded.

6. The method as claimed in claim 5, wherein the further parameter is the level of emissions from the apparatus, the method being such that the influence of the further parameter counterbalances to a predetermined degree the influence of the second parameter.

7. A combustion apparatus, comprising:
a fuel supply line to the apparatus;
a burner including a plurality of fuel-supply lines to the burner, the supply of fuel in the plurality of fuel-supply lines to the at least one burner corresponding to the supply of fuel in the fuel supply line to the apparatus;
a combustion volume associated with the at least one burner;
a temperature sensor located in the apparatus such as to be able to convey temperature information relating to a part of the apparatus to be protected against overheating; and
a control arrangement arranged to vary, dependent on the temperature sensed by the temperature sensor, the fuel supplies to the burner to maintain the temperature of the part to be protected below a predetermined maximum limit, while keeping the fuel supply in the fuel supply line to the apparatus substantially constant,
wherein the plurality of fuel-supply lines comprises a first main fuel-supply line and a second pilot fuel-supply line to the burner to protect against overheating of a part of the apparatus and reduce the risk of low frequency dynamics in the apparatus,
wherein when the value of the temperature exceeds the predetermined maximum limit a ratio of fuel in the first and second lines is changed to reduce the value of the temperature below the predetermined maximum limit to avoid the overheating,
wherein a value of an amplitude of pressure variations within a combustion area of the apparatus, which tends to move the operating point of the apparatus toward a second undesired region of operation with low frequency dynamics in the apparatus is determined, and
wherein when the determined value of the amplitude exceeds the second predetermined maximum limit the ratio is changed to reduce the value of the amplitude of pressure variations below the second predetermined maximum limit to reduce the low frequency dynamics.

* * * * *